United States Patent [19]
Gold

[11] 3,749,122
[45] July 31, 1973

[54] SYSTEM FOR INSTALLING FLUID ELEMENTS IN CONDUIT CIRCUITS

[76] Inventor: Harold Gold, 3645 Tolland Rd., Shaker Heights, Ohio 44122

[22] Filed: Apr. 27, 1971

[21] Appl. No.: 137,880

[52] U.S. Cl.............. 137/515.7, 137/517, 137/542, 138/42, 138/44, 138/46, 239/453, 239/491
[51] Int. Cl............................................. F16k 15/00
[58] Field of Search............................ 285/DIG. 22; 137/454.2, 515, 515.7, 542, 543, 540, 517; 138/46; 29/156.7 R, 157.1 R; 220/40 A

[56] References Cited
UNITED STATES PATENTS

| | | | |
|---|---|---|---|
| 620,936 | 3/1899 | Kunzer............................. | 137/542 X |
| 2,711,840 | 6/1955 | Gits et al. ......................... | 220/42 A |
| 2,984,261 | 5/1961 | Kates................................... | 138/46 |
| 3,194,262 | 7/1965 | Hamilton........................ | 137/525 X |
| 3,434,495 | 3/1969 | Scaramucci......................... | 137/542 |
| 3,442,288 | 5/1969 | Scaramucci......................... | 137/515 |
| 3,516,688 | 6/1970 | Gachot........................ | 137/454.2 X |
| 3,626,978 | 12/1971 | Hoekstra........................... | 137/525.3 |

*Primary Examiner*—Martin P. Schwadron
*Assistant Examiner*—David J. Zobkiw

[57] ABSTRACT

This invention relates to the construction of elements of fluid circuits such as: check valves, pressure and flow regulating valves, circuit breaking valves, restrictors, filters and the like. The construction utilizes the element housing to form a conduit fitting seat-insert. The form thereby permits the circuit element to be installed within a conduit fitting such as a union.

7 Claims, 11 Drawing Figures

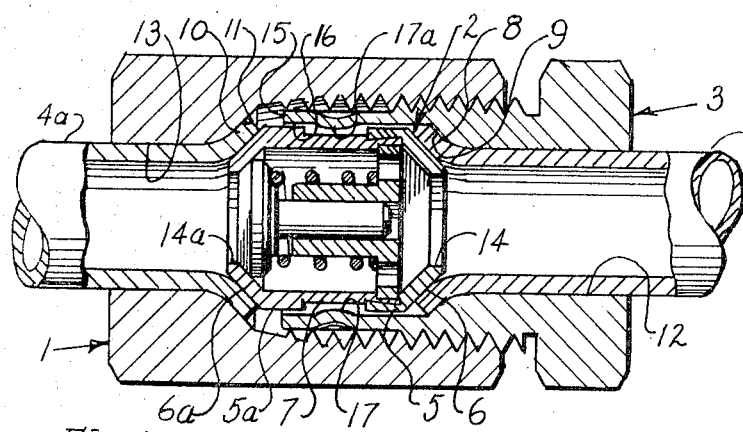

3,749,122

SYSTEM FOR INSTALLING FLUID ELEMENTS IN CONDUIT CIRCUITS

BACKGROUND OF THE INVENTION

1. Field of the Invention

This invention provides a means by which active and passive fluid circuit elements are installed directly within pipe or tube fittings.

2. The Prior Art

In the present invention, utilization is made of the conduit fastening system described in my copending application Ser. No. 124,741 entitled FLUID TIGHT CONDUIT FASTENING SYSTEM, filed Mar. 16, 1971. The two port elements of the present invention duplicate the outer form of the seat-inserts described in the copending application and are directly interchangeable therewith.

SUMMARY OF THE INVENTION

The invention provides a construction through which both active and passive circuit elements are contained within seat-inserts of conduit fittings. The seat-insert form is cylindrical with coaxial end faces. The end faces are clamped by the fitting elements and are thereby joined in fluid tight manner to a tube or pipe. The seat-insert utilizes two cylindrical parts that are joined coaxially. A transverse, axially perpendicular partition, which is secured between the two cylindrical parts, supports elements that coact with passages within the insert to form the active or passive circuit element.

As is disclosed in the Detailed Description, the invention provides means whereby active elements such as check valves and pressure and flow regulating valves; and, passive elements such as orifices and laminar flow type restrictors, and filters can be housed in an externally identical seat-insert form and thereby may be used interchangeably in a conduit fitting. The fitting installation results in a great reduction in conduit fitting and housing components over that required with separate element housings that utilize integral or separate conduit fittings.

BRIEF DESCRIPTION OF THE DRAWINGS

FIG. 1 shows a cross-sectional view of a seat-insert type of tube union in which the seat-insert is, in accordance with this invention, configured to form a check or relief valve;

FIG. 2 shows a duplicate cross-sectional view of the seat-insert shown in FIG. 1, and is included to permit clearer identification of the parts and features;

FIG. 3 shows an enlarged, fragmentary, cross-sectional view of the joining mechanism employed in the seat-insert shown in FIG. 1 and in the subsequent figures;

FIG. 4 shows a cross-sectional view of a seat-insert that is externally a duplicate of the seat-insert shown in FIG. 1 and, in accordance with this invention, is internally configured to form a fluid circuit breaker;

FIG. 5 shows a cross-sectional view of a seat-insert that is externally a duplicate of the seat-insert shown in FIG. 1 and, in accordance with this invention, is internally configured to form a variable-area spray nozzle; and also shows a cross-sectional view of a fitting that is configured to accomodate a spray nozzle;

FIG. 7 shows a cross-sectional view of a seat-insert that is externally a duplicate of the seat-insert shown in FIG. 1 and, in accordance with this invention, is internally configured to form a fixed-area, vortex-type spray nozzle;

FIG. 8 shows a cross-sectional view of a seat-insert that is externally a duplicate of the seat-insert shown in FIG. 1 and, in accordance with this invention, is internally configured to form a flow regulator;

DETAILED DESCRIPTION OF THE INVENTION

Figure 6:
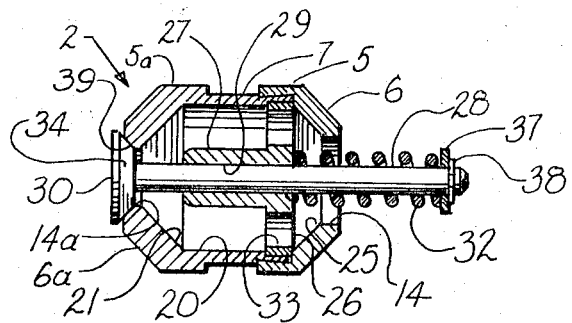
FIG. 6 shows a duplicate cross-sectional view of the seat-insert shown in FIG. 5, and is included to permit clearer identification of the parts and features.

In the description that follows all parts having the same function are identified in all figures by the same numeral.

As described in my copending application, the flared tube union illustrated in FIG. 1 comprises nut body 1, seat-insert 2, bored screw 3 and flared tubes 4 and 4a. Seat-insert 2 is provided with equal diameter cylindrical lands 5 and 5a, coaxial conical ends 6 and 6a and cylindrical groove 7 that is substantially at the mid point. The cone angles of conical end 6, of the flared end 8 of tube 4 and of conical shoulder 9 in screw 3 are substantially equal. Similarly, the cone angles of conical end 6a, of the flared end 10 of tube 4a and of conical shoulder 11 in nut body 1 are substantially equal. Bore 12 in screw 3 mates with tube 4; bore 13 in nut body 1 mates with tube 4a; and bore 14 and bore 14a in seat-insert 2 provide the communicating passages between the internal portion of seat-insert 2 and tubes 4 and 4a. The two sets of mating cones are simultaneously clamped into sealing contact by the screw motion of screw 3 into nut body 1.

Tubular portion 15 is integral with and projects coaxially from screw 3, The outer diameter of tube 15 is equal to or smaller than the root diameter of the threads of screw 3 and the bore 16 is slightly larger than the diameter of lands 5 and 5a. The wall of tube 15 is provided with a pair of diametrically opposite indentations 17 and 17a. The diametral distance between innermost points of indentations 17 and 17a is smaller than the diameter of lands 5 and 5a, but is greater than the diameter of groove 7. The diameter of the indentations 17 and 17a is less than the width of groove 7. Accordingly seat-insert 2 is permitted to move axially and laterally within this attachment for clamping alignment, but remains attached to screw 3 upon disconnection of screw 3 from nut body 1. During insertion into or removal of seat-insert 2 from bore 16 through the application of an axial force between seat-insert 2 and screw 3 tube 15 elastically deforms into oval shape when the indentations 17 and 17a contact land 5. The oval deformation is permitted by the clearance between bore 16 and land 5.

A seat-insert of the present invention, shown in FIGS. 1, 2 and 3, is made of two shells 18 and 19 that join at one side of groove 7. Coaxial bore 20 in shell 18 terminates at one end at conical seat 21 and at the opposite end in counterbore 22. Conical seat 21 converges from the diameter of bore 20 to the diameter of bore 14a. Adjacent to counterbore 22 and contiguous with groove 7, shell 18 is provided with land 23. Counterbore 24 of shell 19 mates with land 23 to attach shell 19 to shell 18. Conical bore 25 of shell 19 expands from the diameter of bore 14 to approximately the diameter of bore 20 and terminates at counterbore 24. Cylindrical partition 26 fits in counterbore 24 and is locked therein by the attachment of shell 19 to shell 18. Valve guide 27 is integral with or is secured to partition 26 and is held coaxial with bore 20 and conical seat 21 thereby. Valve stem 28 mates slideably with coaxial bore 29 in valve guide 27. Valve head 30 is integral with or is secured to stem 28 and is provided with conical face 31 that mates in sealing relationship with seat 21, Spring 32 seats against partition 26 and valve head 30 to urge valve head 30 into contact with seat 21. Holes 33 in partition 26 provide the flow path between bore 20 and conduit 4. The diameter of valve head 30 is less than the diameter of bore 20. When the pressure in conduit 4a exceeds the pressure in conduit 4 by an amount that is sufficient to overcome the force of spring 32 conical face 31 is moved away from seat 21 and fluid from conduit 4a flows around head 30, into bore 20, and through holes 33 into conduit 4.

In the installed position shown in FIG. 1 shell 19 is held in attachment with shell 18 by the clamping action of the tube attachment mechanism. However, when the valve configuration of seat-insert 2 is not held in a fitting assembly spring 32 urges shells 18 and 19 apart. Therefore, for convenience of handling, it is preferable to provide an independent attachment mechanism to hold the seat-insert assembled. The fastening method shown in the enlarged view of FIG. 3 is compatible with the functional requirements and permits a high rate of assembly.

In the mechanism shown in FIG. 3 land 23 is provided with a taper that converges toward groove 7. In the preattached condition, indicated by the dashed lines, counterbore 24 of shell 19 is cylindrical and is adapted to slip freely over the maximum diameter of conical land 23; and land 5 is conical. The cone angle of land 5 in the preattached condition is substantially the same as the cone angle of tapered land 23. When conical land 5 is swaged into cylindrical form by being pressed through a cylindrical die, or compressed in rolls, bore 24 is made conical and mates in locking relationship with conical land 23. Cylindrical partition 26 radially stiffens land 23 against the swaging forces. A secure lock is thereby provided and deformation of bore 20 is prevented. As may be seen in the enlarged view, the parts 18 and 19 are joined in the axially perpendicular plane defined by the surface 26a of partition 26, and 18a of part 18 and the annular surface 19a of part 19.

The seat-insert illustrated in FIG. 4 is interchangeable with the seat-insert shown in FIG. 1 with respect to forming a seal against the flared ends of tubes 4 and 4a, but is internally configured to stop the flow from conduit 4a to conduit 4 when the rate of flow exceeds a preset limit. Valve head 30 is provided with conical shoulder 34 and cylinder 35. Spring seat 36 is a shouldered washer that slips over stem 28 and rests against the shoulder formed by cylinder 35. Spring 32 seats against seat 36 and partition 26 and thereby urges head 30 outward. Washer 37 is retained by snap ring 38 and seats against partition 26, thereby limiting the outward position of head 30. Conical shoulder 34 mates with conical seat 39. Under the condition of flow from conduit 4a to conduit 4 at flow rates below the preset limit the valve elements are as shown in FIG. 4. In this case flow from conduit 4a passes through the annular orifice formed between bore 14a and cylinder 35, through bore 20, holes 33, bore 14 and into conduit 4. When the rate of flow reaches a preset value the pressure drop across the annular orifice , acting on the valve assembly, generates an axial force that is greater than the force exerted by spring 32. When this occurs, conical shoulder 34 moves toward seat 39 thereby increasing the flow resistance of the assembly and an increased pressure drop occurs across the valve assembly. This well known, statically unstable condition results in rapid seating of shoulder 34 against seat 39 and the flow is stopped.

In the flow condition the area of the annular orifice that is formed between bore 14a and cylinder 35 is substantially smaller than the area between conical shoulder 34 and seat 39. The controlling annular area is readily manufactured to high accuracy and is unaffected by axial dimensional variations. This factor permits the shut-off flow condition to be set accurately.

The seat-insert illustrated in FIGS. 5 and 6 is interchangeable with the seat-insert shown in FIG. 1 with respect to the forming of a seal against the flared ends of tube 4 and 4a but is configured in a different manner to form a check or relief valve; but, is more particularly configured to form a pintle-type spray nozzle, for which purpose it is installed in a fitting such as shown in FIG. 5. In the assembly of FIG. 5, seat-insert 2 is clamped between the flared end 8 of tube 4 and conical seat 40 in nut body 1. As is readily apparent from FIGS. 5 and 6 and from the foregoing description stem 28 passes through partition 26 and spring 32 seats against partition 26 and washer 37, thereby urging shoulder 34 of head 30 into sealing contact with seat 39. When the pressure in conduit 4 exceeds the pressure external of nut body 1 in FIG. 5 by an amount that is sufficient to overcome the axial spring force, conical shoulder 34 is moved away from seat 39 and fluid flows from conduit 4, through bore 14, holes 33, bore 20 and discharges in a conical sheet from the conical annulus formed between shoulder 34 and seat 39. Conical recess 41 in nut body 1 provides the necessary clearance for the emission of the spray.

The seat-insert illustrated in FIG. 7 is interchangeable with the seat-insert shown in FIG. 5 with respect to forming a seal against the flared end of tube 4 and seat 40, and also with respect to the formation of a conical spray. In the seat-insert of FIG. 7 partition 26 is integral with coaxial cylinder 42. Conical end 43 of cylinder 42 seats against conical seat 21 and is pressed into this contact by the attachment of shell 19 to shell 18. Coaxial bore 44 and radial bores 45 provide the flow path from bore 14 to bore 20. Cylindrical chamber 46 communicates with bore 20 through holes 47 that are tangential to chamber 46. By the well known action the flow discharging through holes 47 causes a rotational flow in chamber 46, which upon discharging through bore 14a, forms a hollow conical spray.

The seat-insert illustrated in FIG. 8 is interchangeable with the seat-insert shown in FIG. 1 with respect to forming a seal against the flared ends of tubes 4 and 4a, but is internally configured to form a flow regulator. Piston 48 fits slideably in bore 49 and has a coaxial bore 50 and a head 51. Partition 26 includes integral cone 52. The base of cone 52 is flat and is recessed to hold spring 32 in coaxial position. Holes 33 are tangent to cone 52 at its junction with the cylindrical portion of partition 26. The diameter of the base of cone 52 is greater than the diameter of piston 48 but is less than the diameter of bore 20. The diameter of bore 14a is less than the diameter of bore 49, a shoulder 53 being form at the intersection. Orifice 54 provides the fluid passage through head 51 of piston 48. Spring 32 seats against the inner side of head 51 and thereby urges piston 48 toward shoulder 53. The open area of variable orifice 55, which is the cylindrical gap between the open end of piston 48 and the flat base of cone 52, is reduced as piston 48 moves toward the base of cone 52. Flow from variable orifice 55 passes into bore 20 and through holes 33 and bore 14. With the seat-insert 2 of FIG. 8 installed in the union of FIG. 1 the direction of regulated flow is from conduit 4a to conduit 4. In accordance with the well known principal of regulation, the pressure drop across orifice 54 is maintained substantially constant by the variation of the area of orifice 55 through the axial movement of piston 48 in response to the pressure and spring forces.

Figure 9:
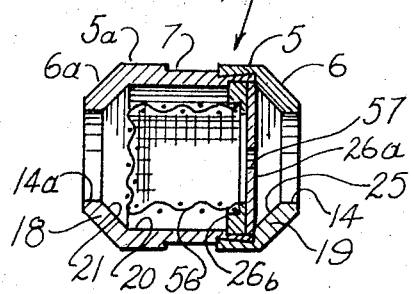
FIG. 9 shows a cross-sectional view of a seat-insert that is externally a duplicate of the seat-insert shown in FIG. 1 and, in accordance with this invention, is internally configured to form a filtered, plate orifice.

The seat-insert illustrated in FIG. 9 is interchangeable with the seat-insert shown in FIG. 1 with respect to forming a seal against the flared ends of tubes 4 and 4a, but is internally configured to form a filter or a filtered orifice. Partition 26 comprises orifice plate 26a and filter ring 26b. Filter element 56 is suitably fastened to ring 26b and is held coaxially in bore 20 thereby. Flow enters through bore 14a, flows through filter element 56, through orifice 57 and exits through orifice 14. Orifice plate 26 is made separate from ring 26b for the convenience of forming the orifice by punching. Where a thin plate orifice is not required orifice plate 26a and ring 26b may be common and orifice 57 formed by drilling. Furthermore, if orifice 57 is enlarged to substantially the diameter of opening of ring 26b, the assembly of FIG. 9 becomes simply a filter.

Figure 10:
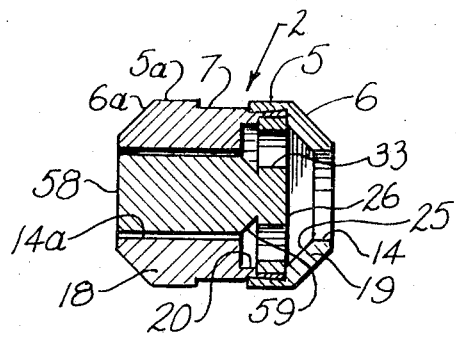
FIG. 10 shows a cross-sectional view of a seat-insert that is externally a duplicate of the seat-insert shown in FIG. 1 and, in accordance with this invention, is internally configured to form a laminar flow restrictor; and, FIG. 11 shows a cross-sectional view of a seat-insert that is formed through a dimensional variation of the internal elements of the seat-insert of FIGS. 1 and 2 and is by this means configured to form a pressure responsive actuator.

The seat-insert illustrated in FIG. 10 is interchangeable with the seat-insert shown in FIG. 1 with respect to forming a seal against the flared ends of tubes 4 and 4a, but is internally configured to form a laminar flow restriction. Cylinder 58 is joined to partition 26 by cone 59 and is held thereby in coaxial position in bore 14a. The diameter of bore 14a is slightly larger than the diameter of cylinder 58, the diametral clearance being set to the flow resistance desired. Bore 20 and holes 33 provide the flow path from the annular clearance to bore 14. As is well known, the flow may be in either direction and the length of cylinder 58 may be greater or less than the length of bore 14a.

Figure 11:
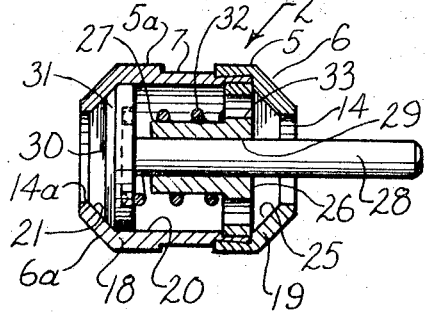

The family of fluid circuit elements described thus far have operated in various manners on the flow through the seat-insert. The seat-insert of FIG. 11 utilizes the internal elements of the seat-insert of FIGS. 1 and 2 to form a fluid circuit element that provides a rod displacement in response to the difference in pressure at the end faces. This configuration finds utility for internal actuation such as is employed in pilot operated check valves. In the seat-insert of FIG. 11 head 30 is made of larger diameter than that shown in FIGS. 1 and 2, and stem 28 is made longer. As shown in FIG. 11 the diameter of head 30 mates with bore 20 to form a piston; and the increased length of stem 28 projects it through partition 26 and beyond bore 14. The relatively short actuator stroke shown in FIG. 11 is sufficient for such operations as required in pilot operated check valves. Where longer stroke is required the length of guide 27 can be shortened; or alternately, partition 26, with the attached guide 27, can be installed in the turned-around position, thereby projecting guide 27 through bore 14.

For conciseness, reference has been made only to seat-inserts having sealing faces that are adapted to mate with flared tubes or conically faced flanges; and, the installation of the seat-insert has been shown only in a tube union. However, as will be readily understood by those skilled in the art, the seat-insert construction of this invention can be employed with the other sealing face arrangements shown in my copending application, referenced above, and to the conduit-to-body assemblies disclosed in that application.

What is claimed is;

1. A seat member for a conduit assembly, said seat member having a coaxial pair of end faces, said end faces forming sealing surfaces that mate with the conduit ends, said end faces being spaced apart by a substantially cylindrical body, said body being substantially coaxial with said end faces, said seat member having:
   a. a first part and a second part, said parts being joined in a plane that is perpendicular to the axis of said end faces;
   b. said first part having a plurality of bores in expanding sequence, the smallest of said bores opening at the end face of said first part and the largest of said bores opening at said perpendicular plane, adjacent bores being connected by annular surfaces;
   c. said second part having a bore that opens at the end face of said second part and having a passage that communicates said bore with said perpendicular plane;
   d. a conical land on said first part radially adjacent said largest bore, the diameter of said land being greatest at said perpendicular plane, and a conical bore in said second part, said conical bore mating with said conical land and forming a locking grip therewith;
   e. a partition that fits in said largest bore of said first part, said partition being held therein by the joining of said parts, through holes being in said partition, said holes providing the flow path across said partition; and,
   f. means coacting with said partition, said means being adapted to provide a pressure-responsive, spring-biased fluid circuit element that operates on the flow between said end faes.

2. The seat member of claim 1 wherein said means coacting with said partition comprises:
   a. a tubular member that is fastened to said partition, the bore of said tubular member being continued through said partition;
   b. a valve member having a stem and a head, the stem of said valve member being guided in the bore of said tubular member and the head of said valve member having a face that mates with and faces the annular surface that is contiguous with said smallest bore;

c. a compression spring, said spring being compressed between said head and said partition and thereby acting to urge said face of said valve toward said annular surface that is contiguous with said smallest bore.

3. The seat member of claim 1 wherein said means coacting with said partition comprises:

a. a tubular member that is fastened to said partition, the bore of said tubular member being continued through said partition;

b. a valve member having a steam and a head, the stem of said valve member being guided in the bore of said tubular member and extending through said bore in said end face of said first part, the head of said valve member having a sealing portion that faces the end face of said first part and is adapted to mate with said end face of said first part, the diameter of said head being greater than the diameter of said bore in said end face of said first part and smaller than the diameter of said end face of said first part; and, c. a compression spring, said spring being compressed between said head and said partition and thereby acting to urge said head away from said end face of said first part.

4. The seat member of claim 3 further including a cylindrical portion between said stem and said head of said valve member, the diameter of said cylindrical portion being larger than the diameter of said stem but smaller than the diameter of said bore in said end face of said first part.

5. The seat member of Claim 1 wherein said means coacting with said partition comprises:

a. a tubular member that is fastened to said partition, the bore of said tubular member being continued through said partition;

b. a valve member having a stem and a head, the stem of said valve member being guided in the bore of said tubular member and extending through said bore in said end face of said first part, the head of said valve member having a sealing portion that faces the end face of said first part and is adapted to mate with said end face of said first part, the diameter of said head being greater than the diameter of said bore in said end face of said first part and smaller than the diameter of said end face of said first part, and said stem projecting through said partition and terminating with a flange; and, c. a compression spring, said spring being compressed between said partition and said flange and thereby acting to urge said head toward said end face of said first part.

6. The seat member of claim 5 wherein said head of said valve member is adapted to mate with a conical recess that is contiguous with said bore in said end face of said first part.

7. The seat member of claim 1 wherein said plurality of bores in said first part comprises a coaxial array of a first bore, a second bore, a third bore and a fourth bore; said first bore being said smallest bore, and wherein said means coacting with said partition comprises:

a. a conical frustum member that is fastened to said partition and which flares outwardly therefrom and projects part-way into said third bore, the diameter of the lower base end of said conical frustum being less than the diameter of said third bore but greater than the diameter of said second bore, said through holes in said partition being outside the upper base of said conical frustum;

b. a hollow piston that mates slideably in said second bore, the open end of said piston coacting with the lower base end of said conical frustum to form a variable orifice, and the head of said piston having an orifice bore; and, c. a compression spring, said spring being compressed between said base end of said conical frustum and the inner face of said head of said piston and thereby acting to urge said piston away from said conical frustum member.

* * * * *